(12) United States Patent
Shukla et al.

(10) Patent No.: US 11,467,922 B2
(45) Date of Patent: Oct. 11, 2022

(54) INTELLIGENT SNAPSHOT GENERATION AND RECOVERY IN A DISTRIBUTED SYSTEM

(71) Applicant: Cisco Technology, Inc., San Jose, CA (US)

(72) Inventors: Amitesh Shukla, San Ramon, CA (US); Manish Jhanji, Santa Clara, CA (US); Satpal Dalal, Cupertino, CA (US); Rakesh Mishra, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 269 days.

(21) Appl. No.: 16/292,219

(22) Filed: Mar. 4, 2019

(65) Prior Publication Data
US 2020/0285547 A1   Sep. 10, 2020

(51) Int. Cl.
  *G06F 11/14*   (2006.01)
  *G06N 20/00*   (2019.01)

(52) U.S. Cl.
  CPC ...... *G06F 11/1469* (2013.01); *G06F 11/1464* (2013.01); *G06N 20/00* (2019.01); *G06F 2201/84* (2013.01)

(58) Field of Classification Search
  CPC .............. G06F 11/1469; G06F 11/1464; G06F 2201/84; G06F 11/0778; G06F 11/0709; G06F 11/1438; G06F 11/1471; G06N 20/00
  See application file for complete search history.

(56) References Cited

U.S. PATENT DOCUMENTS

| | | | |
|---|---|---|---|
| 7,814,057 B2 | 10/2010 | Kathuria et al. | |
| 8,782,472 B2 | 7/2014 | Ganesan et al. | |
| 9,141,683 B1* | 9/2015 | Nagargadde | ........ G06F 11/1464 |
| 9,170,888 B2 | 10/2015 | Salapura et al. | |
| 9,286,182 B2 | 3/2016 | Fries et al. | |
| 9,613,296 B1 | 4/2017 | Kohlenberg et al. | |
| 2010/0257403 A1* | 10/2010 | Virk | .................... G06F 11/1453 714/15 |
| 2020/0034718 A1* | 1/2020 | Beedu | ..................... G06F 16/27 |

* cited by examiner

*Primary Examiner* — Amresh Singh
(74) *Attorney, Agent, or Firm* — Polsinelli (57) ABSTRACT

Systems, methods, and storage media for generating and/or recoverying an end-to-end hybrid cloud snapshot are disclosed. Exemplary implementations may: receive application specific triggering criteria for generating an end-to-end hybrid cloud snapshot; trigger a snapshot event based on the application specific triggering criteria and a machine learning model; accumulate snapshot portions from a plurality of nodes in a hybrid cloud network; and store, in a snapshot database, the end-to-end hybrid cloud snapshot comprising the snapshot portions from the plurality of nodes. Exemplary implementations may further include: generate a recovery model based on a snapshot database, wherein the snapshot database comprises a plurality of network snapshots associated with a network, receive parameters for a desired recovery state, and identify a recommended network snapshot from the plurality of network snapshots based on the recovery model and the parameters for the desired recovery state.

20 Claims, 6 Drawing Sheets

INTELLIGENT SNAPSHOT GENERATION AND RECOVERY IN A DISTRIBUTED SYSTEM

TECHNICAL FIELD

The present disclosure relates to systems, methods, and storage media for generating an end-to-end hybrid cloud snapshot.

BACKGROUND

A snapshot is a set of data that represents a computing state at a particular point in time. Snapshots may be generated for various uses including, for example, archiving, debugging, or rolling back to a previous state upon the occurrence of an event (e.g., a failure or particular error). A snapshot may be taken for a single system or for a global state of a distributed system and may be taken at regular intervals or based on a schedule.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

One aspect of the present disclosure relates to a system configured for generating an end-to-end hybrid cloud snapshot. The system may include one or more hardware processors configured by machine-readable instructions. The processor(s) may be configured to receive application specific triggering criteria for generating an end-to-end hybrid cloud snapshot. The processor(s) may be configured to trigger a snapshot event based on the application specific triggering criteria and a machine learning model. The processor(s) may be configured to accumulate snapshot portions from a plurality of nodes in a hybrid cloud network. Each snapshot portion may include state information and feature information. The processor(s) may be configured to store, in a snapshot database, the end-to-end hybrid cloud snapshot including the snapshot portions from the plurality of nodes.

Other aspects of the subject technology relate to identifying a recommended snapshot based on a recovery model. A system may be configured to generate a recovery model based on a snapshot database, wherein the snapshot database comprises a plurality of network snapshots associated with a network, receive parameters for a desired recovery state, and identify a recommended network snapshot from the plurality of network snapshots based on the recovery model and the parameters for the desired recovery state.

Another aspect of the present disclosure relates to a method for generating an end-to-end hybrid cloud snapshot. The method may include receiving application specific triggering criteria for generating an end-to-end hybrid cloud snapshot. The method may include triggering a snapshot event based on the application specific triggering criteria and a machine learning model. The method may include accumulating snapshot portions from a plurality of nodes in a hybrid cloud network. Each snapshot portion may include state information and feature information. The method may include storing, in a snapshot database, the end-to-end hybrid cloud snapshot including the snapshot portions from the plurality of nodes.

Yet another aspect of the present disclosure relates to a non-transitory computer-readable storage medium having instructions embodied thereon, the instructions being executable by one or more processors to perform a method for generating an end-to-end hybrid cloud snapshot. The method may include receiving application specific triggering criteria for generating an end-to-end hybrid cloud snapshot. The method may include triggering a snapshot event based on the application specific triggering criteria and a machine learning model. The method may include accumulating snapshot portions from a plurality of nodes in a hybrid cloud network. Each snapshot portion may include state information and feature information. The method may include storing, in a snapshot database, the end-to-end hybrid cloud snapshot including the snapshot portions from the plurality of nodes.

Description of Example Embodiments

Computing systems may be configured to generate digital snapshots that include a set of data representing a computing state at a particular point in time. Snapshots may be generated for various uses including, for example, archiving, debugging, or rolling back to a previous state upon the occurrence of an event (e.g., a failure or particular error). In a networked environment or in a distributed system, an overall snapshot (e.g., a global snapshot) may be taken based on data from one or more locations and/or entities. These environments may include cloud computing systems (including multi-cloud environments). Often snapshots are generated periodically or at scheduled times, and are generally not dependent on the state of the system.

However, each snapshot that is generated requires computing resources such as compute resources and time to generate and memory to store. In some cases, each snapshot may be quite computationally expensive to generate and/or large to store. Generating too many snapshots (e.g., generating snapshots at regular intervals) may generate a large amount of snapshot data, and many of these snapshots may be redundant in the sense that they are generated regardless of whether or not there has been a change in the system state and may include duplicative data.

Furthermore, snapshot generation schemes are generally reactive rather than proactive and often fail to generate useful snapshots. For example, one use of snapshots is for debugging or recovery after an event such as an error or failure. As such, snapshots for the time periods immediately before the event are often the most useful. However, periodically generation of snapshots may not capture snapshots that occur immediately before the event. When snapshots are generated upon detection of a triggering event, the snapshots generated typically capture the computing state after the occurrence of the triggering event and may not capture the last "good state" before the event (which is useful in debugging and recovery processes) intermediate states as the computing state approaches the event. Furthermore, in some cases, the triggering event may not be detected and/or the snapshots may not be able to finish generating because of the failure event.

Aspects of the subject technology relate to a more proactive means of capturing snapshots by predicting when an event of interest is to occur and generating one or more snapshots before the event of interest occurs. By anticipating when an event of interest is to occur, a system is able to generate snapshots before the occurrence of the event during a "good state," as the system approaches the event (e.g., as a system deteriorates and/or approaches a failure or error state), during the event, and even after the event. These one or more snapshots may provide a better insight into the state a computing environment over time and may be used more effectively.

For example, in some aspects, a system may be configured to use application specific triggering criteria to generate a snapshot in a hybrid cloud network (e.g., end-to-end hybrid cloud snapshot). The system may trigger snapshot generation based on the application specific triggering criteria and a machine learning model and accumulate one or more snapshot portions from one or more of nodes in a hybrid cloud network. Each snapshot portion may include state information and feature information for the respective node at a certain point in time. The system may aggregate the one or more snapshot portions into an end-to-end hybrid cloud snapshot and store the end-to-end hybrid cloud snapshot in a snapshot database.

Often, after the generation of a large number of snapshots, it is difficult to organize and manage stored snapshots. The process to identify desired snapshots, determine the contents of particular snapshots, and/or determine characteristics of snapshots may involve manual loading, inspection, and/or testing of several snapshots. This is incredibly time consuming and inefficient and requires computing resources (e.g., bandwidth, memory, compute power, etc.).

Aspects of the subject technology relate to a more efficient means of managing, organizing, and/or selecting snapshots from a repository of stored snapshots. For example, in some aspects, a system may be configured to store the generated snapshots in a snapshot database along associated feature information. The snapshots and associated feature information is used by the system to generate a recovery model. The system may then receive parameters for a desired recovery state and identifying one or more recommended hybrid cloud snapshots the snapshot database based on the recovery model and the parameters for the desired recovery state.

Although various aspects of the subject technology are discussed with respect to multi-cloud network environments for illustrative purposes, other aspects of the subject technology can be applied in the context of single system, distributed systems, cloud networks, hybrid cloud networks, datacenter networks, or any other type of network environment.

Figure 1:
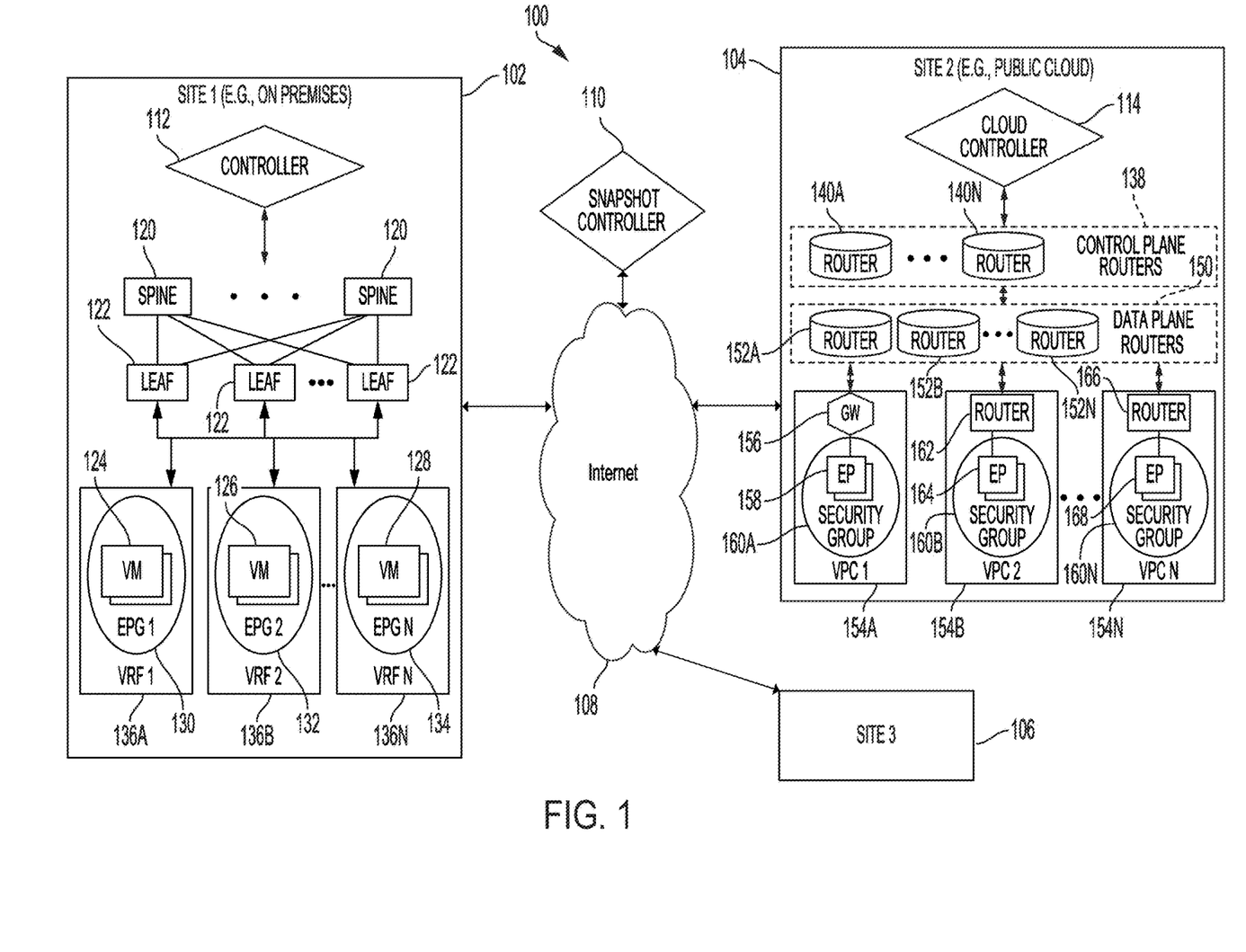
FIG. 1 illustrates an example multi-cloud network environment, in accordance with various aspects of the subject technology.

FIG. 1 illustrates an example multi-cloud network environment 100, in accordance with various aspects of the subject technology. A multi-cloud network environment typically includes multiple sites, networks, and/or clouds (e.g., public and/or private clouds) that are in communication with one another. The example multi-cloud network environment 100 of FIG. 1 includes an on-premises site 102 (e.g., Site 1), such as a private cloud or datacenter, and one or more other sites such as public clouds 104 and 106 (e.g., Site 2 and Site 3). However, in other scenarios, these networks sites may be of any type. In this example, the on-premises site 102 may implement a specific SDN or datacenter solution, such as Cisco's ACI, while the public clouds 104 and 106 may implement different cloud solutions, such as Amazon's AWS and Microsoft's Azure. The various sites in FIG. 1 may communicate with one another via one or more additional networks (e.g., the Internet 108).

The on-premises site 102 can be configured according to the specific SDN or datacenter solution implemented by the on-premises site 102, such as Cisco's ACI, which can be implemented and/or managed via one or more controllers, such as controller 112 (e.g., APIC). The controller 112 can manage security policies and interconnectivity for elements in the on-premises site 102, such as switches (e.g., leaf switches, spine switches, etc.), routers (e.g., physical or virtual gateways or routers, etc.), endpoints (e.g., VMs, software containers, virtual appliances, servers, applications, service chains, workloads, etc.), and/or any other element (physical and/or virtual/logical) in the on-premises site 102. For example, the on-premises site 102 can include spine switches 120 and leaf switches 122 configured to provide network connectivity to VMs 124, 126, and 128 in the on-premises site 102. In this example, the controller 112 can manage security policies and interconnectivity for traffic processed by the spine switches 120, the leaf switches 122, and the VMs 124, 126, and 128.

The controller 112 can configure EPGs 130, 132, and 134 (EPG 1, EPG 2, EPG N), which can be used to manage and implement policies and configurations for groups of endpoints (e.g., VMs 124, 126, 128). EPGs (e.g., 130, 132, 134) are managed objects that contain endpoints (e.g., VMs, software containers, virtual appliances, servers, applications, service chains, workloads, etc.) that are connected to the network (e.g., on-premises site 102) either directly or indirectly. Each EPG (130, 132, 134) can include a group of endpoints. For example, EPG 130 can include VMs 124, EPG 132 can include VMs 126, and EPG 134 can include VMs 128.

The endpoints (e.g., VMs 124, 126, 128) in the EPGs 130, 132, 134 can have certain attributes, such as an address, location, identity, prefix, functionality, application service, etc., and can be physical and/or virtual. EPGs are thus logical grouping of such endpoints based on one or more common factors. Non-limiting example factors which can be used to group endpoints into a common EPG include common security requirements, common VM mobility requirements, common QoS (quality-of-service) settings, common L4-L7 (Layer 4 through Layer 7) services, etc. EPGs (e.g., 130, 132, 134) can span multiple switches and can be associated with respective bridge domains (BDs). In some aspects, endpoint membership in an EPG can be static or dynamic.

EPGs 130, 132, 134 can contain respective endpoint memberships and can represent different EPGs (e.g., logical groupings) that are based on different, respective factors as previously explained. For example, EPG 130 may represent a logical grouping of endpoints (e.g., VMs 124) configured as web servers (e.g., WEB-EPG), EPG 132 may represent a logical grouping of endpoints (e.g., VMs 126) configured as database servers (e.g., DB-EPG), and EPG 134 may represent a logical grouping of endpoints (e.g., VMs 128) configured as specific application servers (e.g., APP.A-EPG). The controller 112 can configure specific policies (e.g., contracts, filters, requirements, etc.) for each of the EPGs 130, 132, 134. Such policies or contracts can define, for example, what EPGs can communicate with each other and what type of traffic can pass between the EPGs 130, 132, 134.

The controller 112 can also configure virtual routing and forwarding (VRF) instances (136A, 136B, 136N) which provide different address domains that serve as private networks and segregate traffic between the VRFs. The VRFs 136A-N can include various, respective objects such as endpoints (e.g., VMs 124, 126, 128) EPGs (e.g., 130, 132, 134), etc. For example, VMs 124 and EPG 130 can reside in VRF 136A, VMs 126 and EPG 132 can reside in VRF 136B, and VMs 128 and EPG 134 can reside in VRF 136N.

The public cloud 104 can include virtual private clouds (VPCs) 154A, 154B, and 154N, which represent private networks on the public cloud 104 and which can be interconnected with the on-premises site 102 and the public cloud 106 as described herein. The VPCs 154A, 154B, and 154N can host applications and resources on the public cloud 104 for use by the on-premises site 102. In some cases, the VPCs 154A, 154B, and 154N can represent or map to VRFs (e.g., 136A, 136B, 136N) on the on-premises site 102.

The VPCs 154A, 154B, and 154N can include endpoints (EPs) 158, 164, and 168 on the public cloud 104. For example, VPC 154A can include EPs 158, VPC 154B can include EPs 164, and VPC 154N can include EPs 168. The EPs 158, 164, 168 can include virtual/logical and/or physical endpoints, such as VMs, software containers, physical servers, etc. The EPs 158, 164, 168 can be included in security groups 160A, 160B, 160N, which are policy constructs implemented by the public cloud 104, and which can be translated to EPGs as described herein. The security groups 160A, 160B, 160N can include one or more respective security policies defined for traffic matching one or more attributes associated with the security groups 160A, 160B, 160N, such as IP addresses (e.g., the IP addresses of EPs 158, 164, 168 in the security groups 160A, 160B, 160N), labels (e.g., VM labels or tags), EP attributes (e.g., VM names or characteristics), IP prefixes, etc.

Traffic to and from the VPCs 154A, 154B, and 154N can be routed via routers 156, 162, and 166, which can include virtual cloud routers, virtual private gateways or VPN gateways (hereinafter "vGWs"), cloud services routers (CSR) such as Cisco CSR1 kV routers, and the like. The routers 156, 162, 166 can serve as the ingress and egress points of the VPCs 154A, 154B, 154N, and can interconnect the VPCs 154A, 154B, 154N with each other as well as other external devices or networks (e.g., on-premises site 102 and public cloud 106) through a cluster 150 of data plane routers 152A, 152B, 152N. The data plane routers 152A, 152B, 152N can include virtual cloud routers, virtual gateways, CSR routers such as Cisco CSR1 kV routers, and the like.

The routers 156, 162, and 166 can provide interconnectivity between the public cloud 104 and the on-premises site 102 and the public cloud 106 through a cluster 138 of control plane routers 140A and 140N. The control plane routers 140A and 140N can manage the importing and exporting of routes into the on-premises site 102, the public cloud 106, etc., in order to support interconnectivity between the public cloud 104, the on-premises site 102, and the public cloud 106. In some implementations, the control plane routers 140A and 140N can import and export routes using EVPN (Ethernet Virtual Private Network) BGP (border gateway protocol). The control plane routers 140A and 140N can establish BGP sessions with the on-premises site 102 and/or the public cloud 106 to exchange routes.

The control plane routers 140A and 140N can include BGP speakers or agents for establishing BGP sessions. In some implementations, the control plane routers 140A and 140N support or implement two control plane sessions (e.g., BGP sessions) with every other site (e.g., on-premises site 102 and public cloud 106) for redundancy and intersite connectivity. In other implementations, the control plane routers 140A and 140N may support or implement more or less control plane sessions for every other site. For example, the control plane routers 140A and 140N may support or implement a single control plane session for one or more other site (e.g., on-premises site 102 and/or public cloud 106) or more than two control plane session for one or more other site (e.g., on-premises site 102 and/or public cloud 106).

The control plane routers 140A and 140N can include CSR routers, such as Cisco CSR1 kV routers, and can be equipped with sufficient capacity to store and manage all the routes for the public cloud 104. Moreover, the control plane routers 140A and 140N can support or implement internal control plane sessions (e.g., BGP sessions) with a cluster 150 of data plane routers 152A, 152B, 152N and/or routers 156, 162, 166 on the VPCs 154A, 154B, 154N, to exchange and manage routing information for the public cloud 104. In some cases, the control plane routers 140A and/or 140N can also double up as data plane routers. For example, the control plane routers 140A and/or 140N can double up as data plane routers in addition to, or in lieu of, other data plane routers (e.g., 152A, 152B, 152N).

In some cases, as further described below, the data plane routers 152A, 152B, 152N can be mapped or designated to a specific subset of VPCs 154A, 154B, 154N in order to distribute data plane routing functionalities and responsibilities for traffic to and from the VPCs 154A, 154B, 154N amongst the data plane routers 152A, 152B, 152N. Here, the control plane routers 140A and 140N can manage the distribution of internal routes to map the data plane routers 152A, 154B, 152N to respective VPCs 154A, 154B, 154N and/or distribute the routing functionalities and responsibilities accordingly.

The multi-cloud network environment 100 can also include a snapshot controller 110 which communicates with controller 112 in the on-premises site 102 and cloud controllers 114 (e.g., cloud APICs) respectively on the public cloud 104 and the public cloud 106, and works with controller 112 and cloud controllers (e.g., 114) to manage snapshot generation and recovery processes on both the on-premises site 102 and the public clouds 104 and 106. In some embodiments, the snapshot controller 110 may be implemented at one of the sites either as a discrete entity or part of one of the controllers 114, at a separate site, on one or more endpoints (e.g., VMs 124, 126, and 128) at one or more of the sites, or as a distributed system across multiple sites.

The snapshot controller 110 is configured to use one or more machine learning models. For example, a snapshot generation model may be used to trigger snapshot generation and a snapshot recovery model may be used to determine the most suitable snapshot to be used for recovery. The snapshot generation model may be generated based on operation data of the system and used to predict when an event of interest may occur and determine (e.g., schedule) when a snapshot generation process should be triggered. The operational data may include parameters, features, predictors, characteristics, metrics, or other data associated with the operation of the system. Example operational data may include end-to-end latencies, throughput metrics, per hop latencies, packet drop counts at each node along the path or the entire path, load per node metrics, available bandwidth per node, CPU load per node, number of flows per node, number of connections, number of opened TCP ports, etc. The operational data may also include and/or be associated with temporal parameters such as date, day of week, weekend, weekday, time of the day, or holiday, locational parameters such as city, country, or continent, or other parameters.

According to some embodiments, the output of the snapshot generation model is a forecast of when a snapshot should be triggered. For example, a snapshot is triggered one or more periods of time before a specific system feature reaches a threshold value, when the specific system feature reaches the threshold value, and/or one or more periods of time after the specific system feature reaches the threshold value. This feature and threshold may be determined on an application by application basis based on an application's own needs and limitations. For example, based on the snapshot generation model, the snapshot controller 110 may able to predict when a number of successful requests handled by a specified application (e.g., the trigger feature) will be lower than 10000 (e.g., the trigger threshold).

When a snapshot is triggered, the snapshot controller 110 may be configured to transmit a communication to one or more nodes in the multi-cloud network instructing the one or more nodes to generate a snapshot (or their portion thereof). For example, the snapshot controller 110 may be configured to transmit a message (e.g., a SnapMessage) to nodes in the multi-cloud network instructing each node to generate a node-level snapshot. These node-level snapshots may represent a portion of the global snapshot of the multi-cloud network and be aggregated into the global snapshot for archiving. In some embodiments, multiple SnapMessages may be sent to a number of nodes or, in other embodiments, a single SnapMessage may be sent and propagated through the multi-cloud network. As the SnapMessage makes its way through the multi-cloud network, portions of the snapshot may be aggregated along the path to form the global snapshot of the multi-cloud network.

The snapshot recovery model is another machine learning model that is used to determine which snapshot is most suitable (as defined as the snapshot that has features most similar to a set of desired feature values defined by an administrator or configuration definition). Once one or more suitable snapshots are identified, the snapshot controller 110 may automatically recover the multi-cloud network using the most suitable snapshot and/or present a list of the one or more snapshots to a network administrator who will select and/or approve of recovery using a snapshot.

Figure 2:
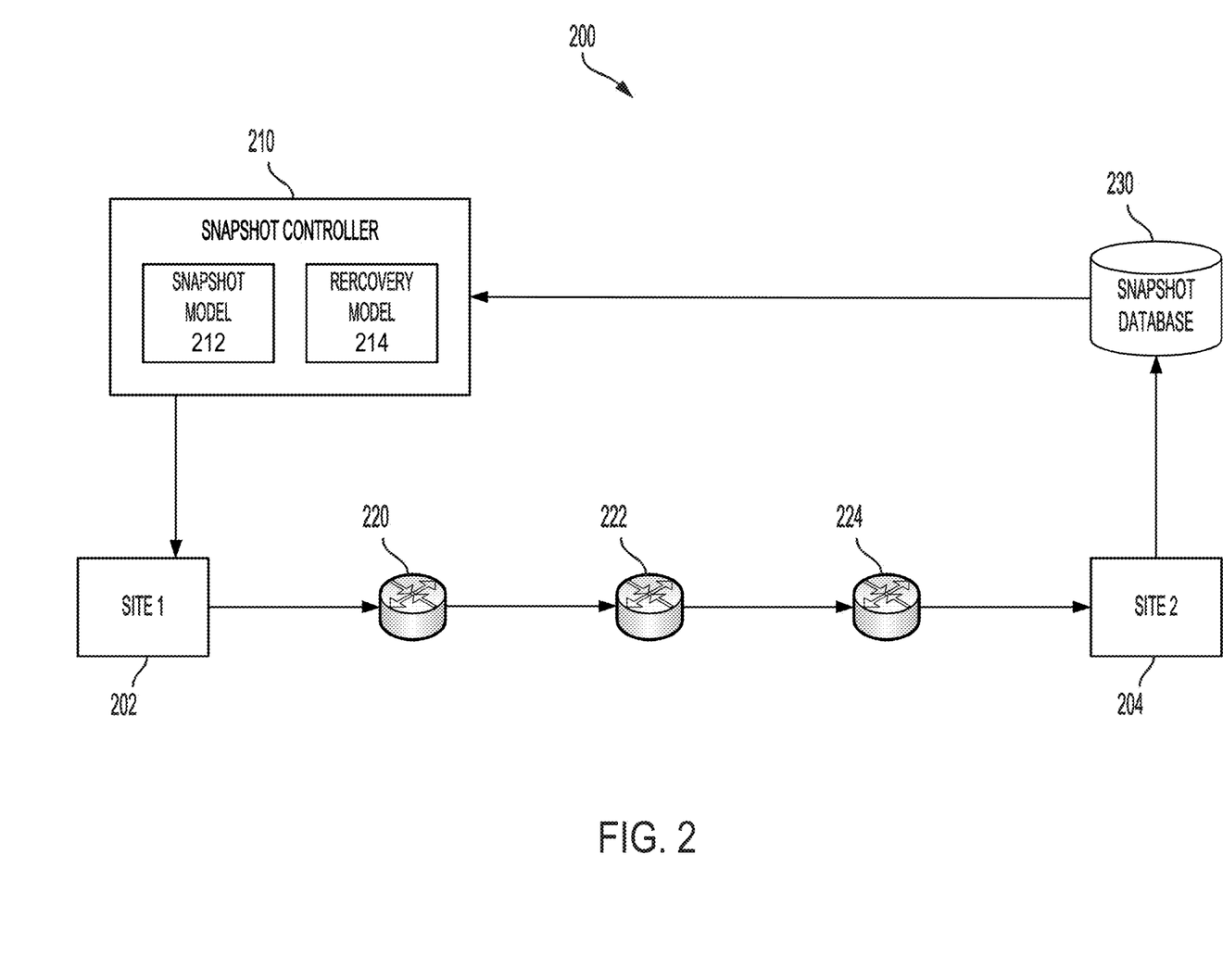
FIG. 2 illustrates another example multi-cloud network environment, in accordance with various aspects of the subject technology.

FIG. 2 illustrates another example network environment 200, in accordance with various aspects of the subject technology. The network environment 200 is simplified for illustrative purposes and may represent networks of various configurations (e.g. cloud/multi-cloud networks, data center networks, distributed networks, etc.). The simplified network environment 200 of FIG. 2 includes two sites (site 1 202 and site 2 204) that may represent computing machines, networks, applications, virtual machines, endpoints, or other network entities. Site 1 202 and site 2 204 may communicate via a network path that includes intermediate nodes 220, 222, and 224. The intermediate nodes 220, 222, and 224 may be any of the network entities above or other network infrastructure entities such as routers, switches, firewalls, middle boxes, gateways, etc.

A snapshot controller 210 may be implemented as part one of the network entities 202, 204, 220, 222, 224, or as a separate entity and is configured to receive operation data from the network entities 202, 204, 220, 222, 224 and generate a snapshot model 212. The snapshot model 212 is a machine learning module responsible for predicting/forecasting snapshot triggers and may be hosted in the snapshot controller 210 or in a private/public cloud/application server.

For example, the snapshot model 212 forecasts degradation in application performance due to network congestions or predicts process failure or other such events. Performance degradation issues can be treated as a time series forecasting problem in machine learning algorithms such as time series linear model (TSLM) forecasting or seasonal naive models (if the load is seasonal in nature) can be utilized in such problems. The snapshot model 212 may also be used to predict the healthy states and trigger snapshot for future recovery.

The snapshot controller 210 is also configured to receive application specific triggering criteria for generating an end-to-end hybrid cloud snapshot from a configuration file or input from a network administrator. Based on the application specific triggering criteria and the snapshot model 212, the snapshot controller 210 is configured to trigger a snapshot event by transmitting a SnapMessage to one or more of the network entities 202, 204, 220, 222, 224 instructing the network entities 202, 204, 220, 222, 224 to generate their respective snapshot portions.

FIG. 2 illustrates the snapshot controller 210 transmitting the SnapMessage to site 1 202. Site 1 202 generates its snapshot portion and transmits the snapshot portion with the SnapMessage to node 220, which also generates its snapshot portion and passes on the snapshot portions and SnapMessage to the next node 222, and so on and so forth until the data reaches site 2 204. The accumulated snapshot portions may then be stored in snapshot database 230. In some embodiments, the accumulated snapshot portions are transmitted to the snapshot controller 210 for storage in the snapshot database 230, while in other embodiments, the snapshot portions are stored directly in the snapshot database 230. Furthermore, in some embodiments, each snapshot portion is transmitted directly to the snapshot controller 210 or snapshot database 230 rather than being passed through the network path. The snapshots stored in the snapshot database 230 may then be used by the snapshot controller 210 to generate the recovery model 214 that can be used to identify recommended snapshots that meet a set of snapshot parameters.

Figure 3:
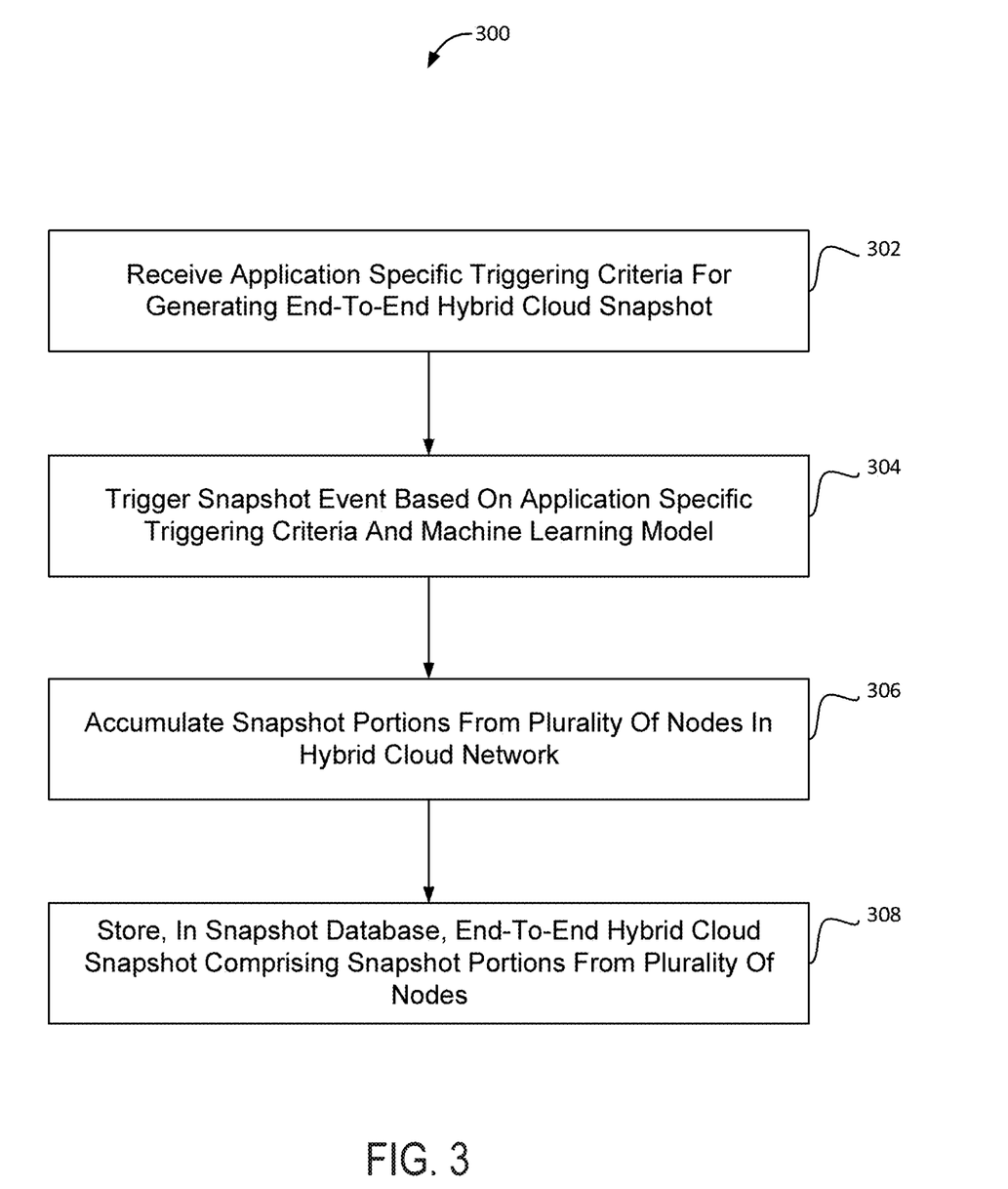
FIG. 3 illustrates a method for generating an end-to-end hybrid cloud snapshot, in accordance with one or more implementations.

FIG. 3 illustrates a method 300 for generating an end-to-end hybrid cloud snapshot, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300. In some embodiments, method 300 may be implemented by s snapshot controller. The snapshot controller may receive network performance metrics for the hybrid cloud network and generate (or update) a machine learning model (e.g., a snapshot generation model) based on the metrics.

An operation 302 may include receiving application specific triggering criteria for generating an end-to-end hybrid cloud snapshot. The application specific triggering criteria specifies an event of interest so that the snapshot controller can trigger the snapshot event a period of time before the event of interest, during the event of interest, or a period of time after the event of interest. For example, the triggering criteria may specify a condition where there is a degradation in performance of an application running in the hybrid cloud, the hybrid cloud as a whole, a particular component in the hybrid cloud, or any other measure.

An operation 304 may include triggering a snapshot event based on the application specific triggering criteria and a machine learning model. This may include transmitting snapshot generation instructions (e.g., a SnapMessage) to one or more of the nodes in the hybrid cloud network. In some embodiments, before the snapshot generation event is triggered, the snapshot controller can transmit, to a user system associated with a network administrator, a notification that an event of interest is predicted to occur, has occurred, or is occurring and request to initiate generation of the end-to-end hybrid cloud snapshot. The network administrator may review the request and respond with instructions to initiate the generation of the end-to-end hybrid cloud snapshot.

An operation 306 may include accumulating snapshot portions from a plurality of nodes in a hybrid cloud network. Each snapshot portion may include state information and feature information. An operation 308 may include storing, in a snapshot database, the end-to-end hybrid cloud snapshot including the snapshot portions from the plurality of nodes. The hybrid cloud snapshot may further be indexed by the snapshot controller based on the feature information associated with the snapshot portions so that a recovery model may be generated.

Figure 4:
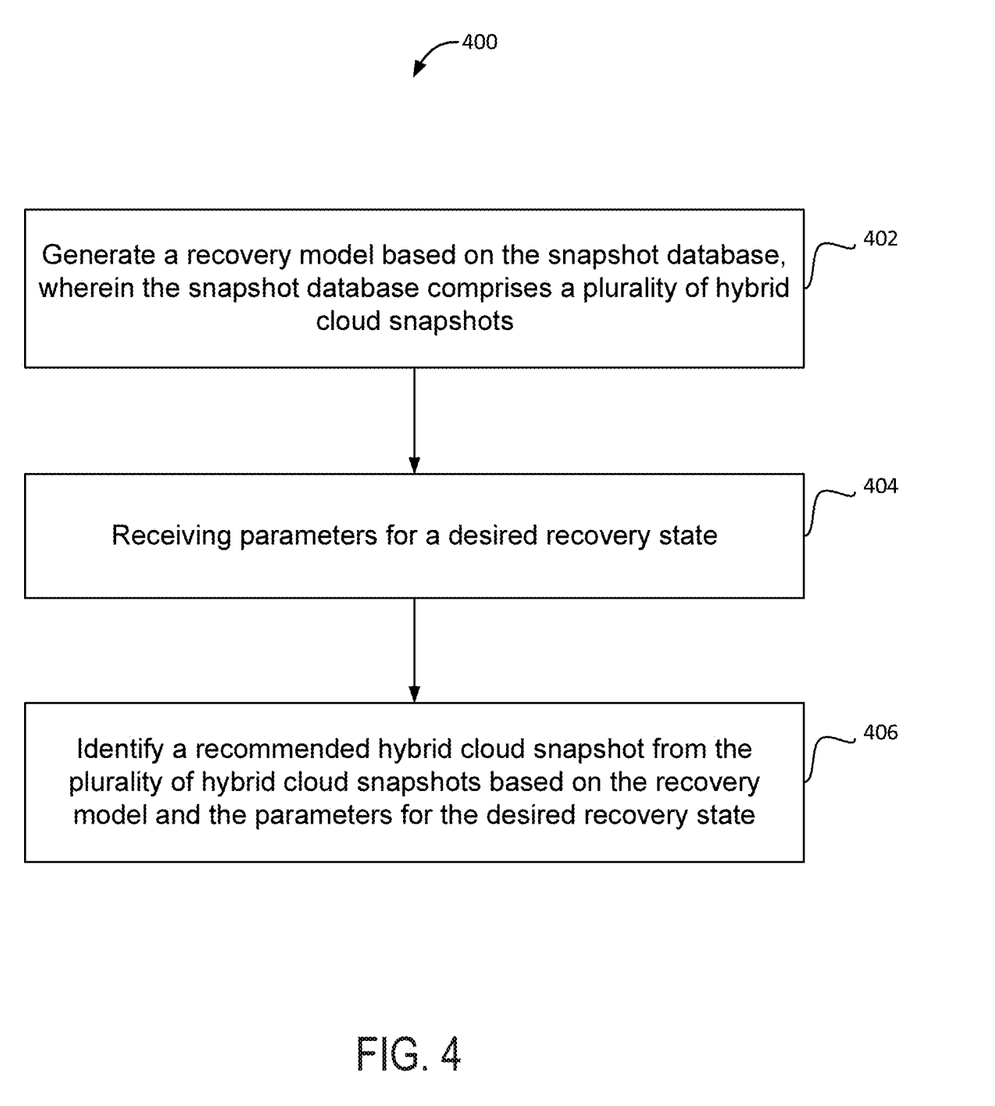
FIG. 4 illustrates a method for identifying a recommended hybrid cloud snapshot, in accordance with one or more implementations.

FIG. 4 illustrates a method 400 for identifying a recommended hybrid cloud snapshot, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400. In some embodiments, method 400 may be implemented by s snapshot controller.

Operation 402 may include generating a recovery model based on the snapshot database, wherein the snapshot database comprises a plurality of hybrid cloud snapshots. At operation 404, the snapshot controller may receive parameters for a desired recovery state. The parameters may be received from a configuration file and/or input from a network administrator. At operation 406, the snapshot controller may identify a recommended hybrid cloud snapshot from the plurality of hybrid cloud snapshots based on the recovery model and the parameters for the desired recovery state.

The snapshot controller may also transmit, to a user system associated with a network administrator, one or more communications notifying the network administrator of the recommended snapshot and requesting authorization to initiate recovery of the hybrid cloud network based on the recommended hybrid cloud snapshot. The snapshot controller may receive, from the user system, instructions to initiate the recovery of the hybrid cloud network based on the recommended hybrid cloud snapshot. In other embodiments, the snapshot controller may automatically recover the network without requiring authorization from the network administrator. Additionally, the snapshot controller may notify the network administrator that the recovery process has initiated.

Various embodiments may be applied in a large number of situations, scenarios, and applications. In an illustrative scenario of video streaming applications in the cloud, various factors are responsible for video streaming load in the network/cloud at any given time. For example, streaming load on individual nodes in the cloud network in terms of bandwidth utilization, CPU cycle availability, etc. For example, it might be observed that the demand and the streaming load is higher on weekend nights as compared to weekdays, or the load may be high during holidays due to more people consuming streaming content.

Other factors such as time of the day (e.g., 10 am-12 pm, 8 pm-11 pm, etc.), city (e.g., San Francisco, London, etc.), country or continent, holiday or not, month, season (e.g., summer, winter, etc.), genre of the content (e.g., comedy, thriller, etc.) will have some or the other influence on the streaming load combined together. Streaming load may be higher between 7 pm-11 pm during the holiday season (December 22-January 2nd) in the USA as compared to Asian countries, or streaming load variations within different time zone/cities in the US at any given time. As noted here, based on various different parameters streaming load may vary significantly. Large numbers of combinations of these parameters are possible which makes a fixed rule based applications more difficult to implement.

The snapshot controller is configured to forecast a label (in this case network streaming load), based on parameters such as those mentioned above. For example, the parameter/label combination for the snapshot generation model for the video streaming scenario may include parameters/features (e.g., weekend, weekday, time of the day, special content, holiday, genre, city, country, continent) and labels for forecasting/prediction (e.g., forecasting the video streaming load). The parameter list above is not exhaustive and many new features can be included based on the available data. Once the data is acquired, the snapshot controller builds the snapshot generation model, which is used to forecast the streaming load, ahead of time.

For the video streaming scenario, one or more thresholds may be specified above which the snapshot controller may be configured to trigger the snapshot generation across the network/cloud. For example, a threshold for the streaming application may be defined as 1 million user connections or in terms of some bandwidth utilization. This may be a static value based on certain behavior. For example, the video streaming application may start seeing traffic drop, reduced quality in terms of pixels, buffering issues over 1 million users. Hence for this application, the system may want to keep a snapshot of the cloud system before this threshold is hit, so that a good snapshot is available for future recovery.

In this illustrative scenario, the snapshot controller is configured to forecast the load based on the snapshot generation model. For example, the predicted load for Sunday at 9 pm may be 1.2 million users while the predicted load for Monday at 3 pm may be 0.1 million users. A large number of predicted values may be generated and based on the generated values, the snapshot controller determines that the forecasted load for Sunday at 9 pm is more than threshold. Accordingly, a snapshot event may be scheduled and/or triggered at one or more periods of time (e.g., immediately before, 5 minutes before, an hour before, etc.) before the predicted event.

Once the snapshot controller triggers the snapshot event based on the snapshot generation model, the components (e.g., sites and intermediate nodes) that will generate portions of the snapshot are notified across the network. For example, a SnapMessage may be transmitted by the snapshot controller to one or more components in the network. In accordance with some embodiments, the format of the SnapMessage may be as follows:

```
SnapMessage = {
    snapshot_trigger = TRUE;
    number_of_successful_requests_handled_by_the_application;
    end_to_end_latency;
    current_throughout_level;
    per_hop_latency;
    packet_drop_count (at each node along the path);
    load_per_node (bandwidth or any other measure);
    available_bandwidth_on_this_node;
    cpu_load_on_this_node;
    number_of_flows;
    number_of_connections;
}
```

The example SnapMessage format above notifies receiving components that a snapshot event has been triggered and the event type that has triggered the snapshot event. In the example above, the event type is "number_of_successful_requests_handled_by_the_application." Example conditions for this event type may be defined as, for example, request_handled<10000, 50000>=request_handled>=10000, etc. The SnapMessage may further specify the types of feature information (e.g., end-to-end latency, throughput levels, per hop latencies, packet drop counts, load levels, bandwidth, flow and connection numbers, or other predictors) to be collected and transmitted along with the generated snapshot portion. The feature information may be used by the snapshot controller to update the snapshot generation model and/or classify and index the resulting snapshot for use in the recovery stage. The SnapMessage transmitted by the snapshot controller flows across the cloud network and above predictors are captures across and delivered to the recovery module, along with the corresponding snapshot portions which are aggregated and stored as a snapshot in the snapshot database.

The recovery stage may be based on a desired level of predictors, which is specified as a test vector to the snapshot recovery model. This mechanism helps to discover the nearest snapshot match for the recovery. The test vector may be specified to the snapshot controller in a recovery message sent from a network administrator or other system. The test vector contains the desired level of predictors, which is used to find the nearest matching snapshot from the snapshot database. For example, the desired recovery may seek for End to End Latency=10, Number of Connections=1000, Packet Drop Count<100 etc. In this scenario based on these predictor values, the ML module will predict the best-matched snapshot for the recovery. According to some embodiments, the recovery message format may be as follows:

```
RecoveryMessage = {
    recovery_trigger = TRUE;
    number_of_successful_requests_handled_by_the_application = 1.2M;
    end_to_end_latency = 10ms;
    current_throughput_level = 1500;
    per_hop_latency = 15 ns,
    packet_drop_count (at each node along the path) = Less than 100;
    load_per_node (bandwidth or any other measure);
    available_bandwidth_on_this_node = 28Gb;
    cpu_load_on_this_node;
    number_of_flows = 60000;
    number_of_connections = 1.5M;
}
```

Each of the above variables specified in the example RecoveryMessage represents a predictor/feature. Let us say, there are X number of previously stored snapshots, with different predictor variable values. The snapshot controller is configured to recover to a state which is as close to the predictor values as shown above in the recovery message. The snapshot recovery model is presented with these predictor values as a test vector and the snapshot controller identifies top snapshots close to these numbers. This will ensure that the system recovers from a snapshot which is capable of providing a state as close to the desired state.

Figure 5:
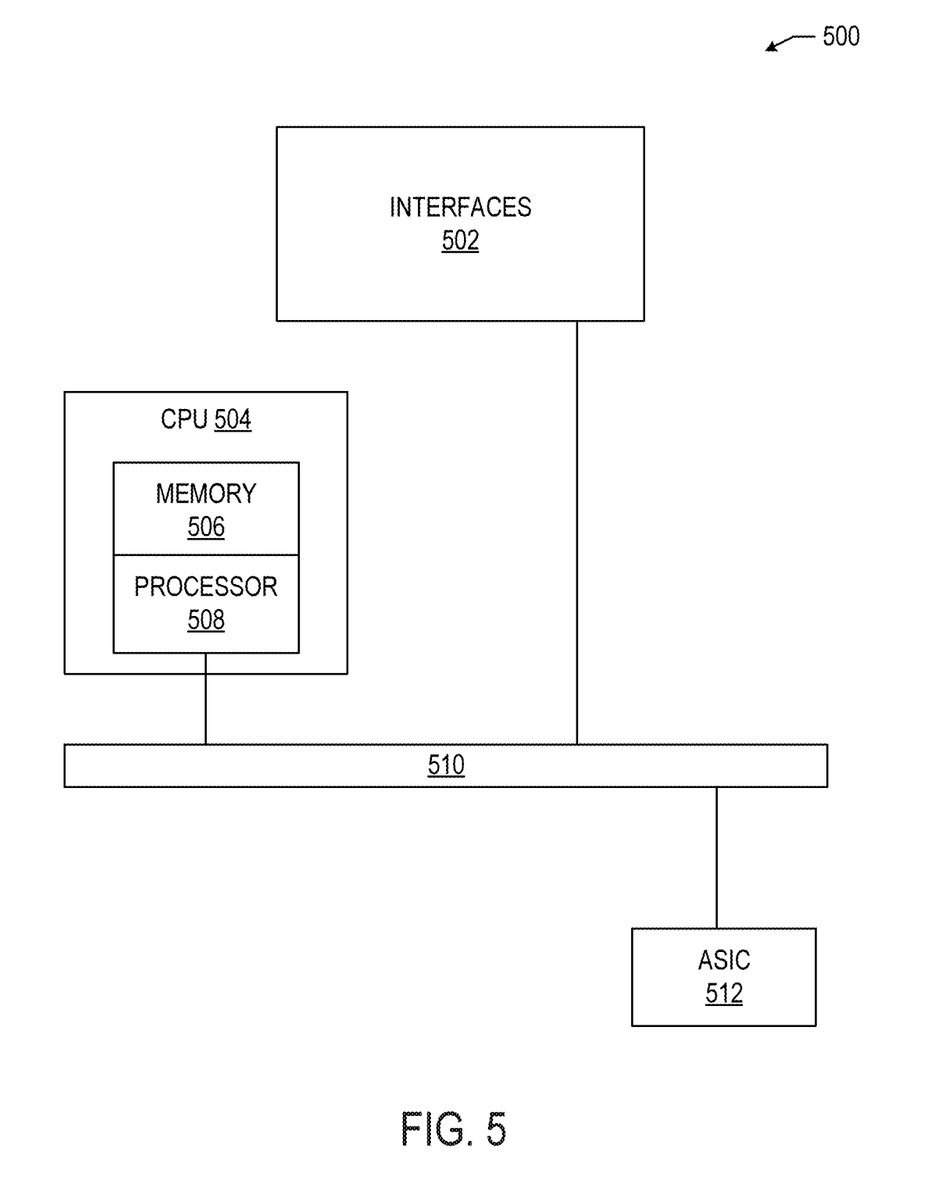
FIG. 5 illustrates an example network device in accordance with various examples.
Figure 6:
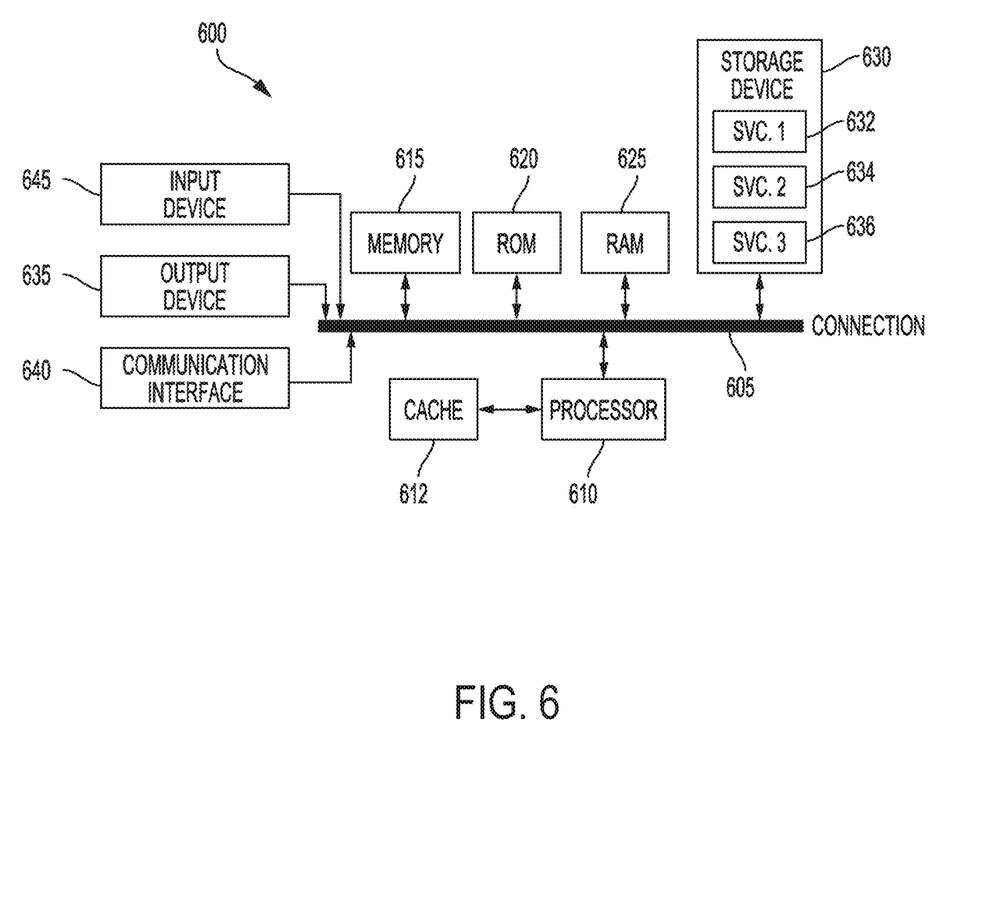
FIG. 6 illustrates an example computing device in accordance with various examples.

The disclosure now turns to FIGS. 5 and 6, which illustrate example network devices and computing devices, such as switches, routers, client devices, endpoints, servers, and so forth.

FIG. 5 illustrates an example network device 500 suitable for implementing policy agents and performing switching, routing, and other networking operations. Network device 500 includes a central processing unit (CPU) 504, interfaces 502, and a connection 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC) 512, which can be configured to perform routing and/or switching operations. The ASIC 512 can communicate with other components in the network device 500 via the connection 510, to exchange data and signals and coordinate various types of operations by the network device 500, such as routing, switching, and/or data storage operations, for example.

FIG. 6 illustrates a computing system architecture 600 wherein the components of the system are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A system comprising:
one or more processors; and
at least one non-transitory computer-readable medium having stored thereon instructions which, when executed by the one or more processors, cause the one or more processors to:
receive application specific triggering criteria for generating an end-to-end hybrid cloud snapshot;
predict an occurrence of an event of interest associated with the application specific triggering criteria, wherein the event of interest comprises at least one of an error associated with one or more of a plurality of nodes in a hybrid cloud network and a performance degradation of an application running at one or more of the plurality of nodes;
trigger a snapshot event based on a machine learning model and the event of interest associated with the application specific triggering criteria, wherein:
an output of the machine learning model is a forecast of when the snapshot event should be triggered;
the snapshot event is triggered prior to the occurrence of the event of interest, based on the forecast; and
triggering the snapshot event includes generating one or more snapshots for the plurality of nodes at a period of time prior to the occurrence of the event of interest;

aggregate snapshots from the plurality of nodes into the end-to-end hybrid cloud snapshot, wherein each snapshot comprises state information associated with a respective node and captured prior to the event of interest associated with the application specific triggering criteria;

store, in a snapshot database, the end-to-end hybrid cloud snapshot;

predict a recovery state associated with the plurality of nodes, the recovery state comprising a state without at least one of the error and the performance degradation; and based on the predicted recovery state, identify a recovery snapshot from a set of snapshots in the snapshot database.

2. The system of claim 1, wherein the application specific triggering criteria specifies the event of interest, and wherein the snapshot event is triggered a period of time before the event of interest.

3. The system of claim 1, wherein the recovery snapshot is identified further based on a set of snapshot parameters from at least one of a configuration file and a user input.

4. The system of claim 1, wherein triggering the snapshot event comprises transmitting snapshot generation instructions to one or more of the plurality of nodes in the hybrid cloud network.

5. The system of claim 1, wherein the instructions, when executed by the one or more processors, cause the one or more processors to receive network performance metrics for the hybrid cloud network, wherein the triggering of the snapshot event is further based on the network performance metrics.

6. The system of claim 1, wherein each snapshot further comprises feature information, and wherein the instructions, when executed by the one or more processors, cause the one or more processors to index the end-to-end hybrid cloud snapshot based on the feature information associated with the snapshots.

7. The system of claim 1, wherein the recovery snapshot is selected from a set of end-to-end-hybrid cloud snapshots including the end-to-end hybrid cloud snapshot, and wherein the snapshot event is triggered at one or more periods of time before reaching a threshold associated with at least one of the error and the performance degradation.

8. A method comprising:
receiving application specific triggering criteria for generating a snapshot;
predicting an occurrence of an event of interest associated with the application specific triggering criteria, wherein the event of interest comprises at least one of an error associated with one or more of a plurality of nodes in a hybrid cloud network and a performance degradation of an application running at one or more of the plurality of nodes;
triggering a snapshot event based on a machine learning model and the event of interest associated with the application specific triggering criteria, wherein:
an output of the machine learning model is a forecast of when the snapshot event should be triggered;
the snapshot event is triggered prior to the occurrence of the event of interest, based on the forecast; and
triggering the snapshot event includes generating one or more snapshots for the plurality of nodes at a period of time prior to the occurrence of the event of interest;
aggregating snapshots from a plurality of nodes in a network into an aggregated snapshot, wherein each snapshot comprises state information associated with a respective node and captured prior to the event of interest associated with the application specific triggering criteria;
storing, in a snapshot database, the aggregated snapshot;
predicting a recovery state associated with the plurality of nodes, the recovery state comprising a state without at least one of the error and the performance degradation; and
based on the predicted recovery state, selecting a recovery snapshot from a set of snapshots in the snapshot database.

9. The method of claim 8, wherein the application specific triggering criteria specifies the event of interest and wherein the snapshot event is triggered a period of time before the event of interest.

10. The method of claim 8, wherein the plurality of nodes in the network include at least one of a server, a virtual machine, a container, a micro-service, a switch, a router, a data center, or a sub-network.

11. The method of claim 8, further comprising:
transmitting, to a user system associated with a network administrator, a request to initiate generation of the snapshot; and
receiving, from the user system, instructions to initiate the generation of the snapshot.

12. The method of claim 8, further comprising:
generating a recovery model based on the snapshot database, wherein the snapshot database comprises a plurality of snapshots;
receiving parameters for a desired recovery state corresponding to the recovery state; and
identifying the recovery snapshot from the plurality of snapshots based on the recovery model and the parameters for the desired recovery state.

13. The method of claim 12, further comprising:
transmitting, to a user system associated with a network administrator, a request to initiate recovery of the network based on the recovery snapshot; and
receiving, from the user system, instructions to initiate the recovery of the network based on the recovery snapshot.

14. The method of claim 12, further comprising transmitting, to a user system associated with a network administrator, a communication specifying the recovery snapshot.

15. The method of claim 8, wherein the application specific triggering criteria specifies the event of interest, the method further comprising transmitting, to a system associated with a network administrator, a communication indicating an occurrence of the event of interest.

16. The method of claim 8, wherein the aggregated snapshot is an end-to-end hybrid cloud snapshot.

17. A non-transitory computer-readable storage medium having instructions stored thereon, the instructions when executed by one or more processors, cause the one or more processors to:
receive application specific triggering criteria for generating an end-to-end network snapshot;
predict an occurrence of an event of interest associated with the application specific triggering criteria, wherein the event of interest comprises at least one of an error associated with one or more of a plurality of nodes in a hybrid cloud network and a performance degradation of an application running at one or more of the plurality of nodes;

trigger a snapshot event based on a machine learning model and the event of interest associated with the application specific triggering criteria, wherein:

an output of the machine learning model is a forecast of when the snapshot event should be triggered;

the snapshot event is triggered prior to the occurrence of the event of interest, based on the forecast; and triggering the snapshot event includes generating one or more snapshots for the plurality of nodes at a period of time prior to the occurrence of the event of interest;

aggregate snapshots from a plurality of nodes in a network into the end-to-end network snapshot, wherein each snapshot comprises state information associated with a respective node and captured prior to the event of interest associated with the application specific triggering criteria;

store, in a snapshot database, the end-to-end network snapshot;

predict a recovery state associated with the plurality of nodes, the recovery state comprising a state without at least one of the error and the performance degradation; and based on the predicted recovery state, identify a recovery snapshot from a set of snapshots in the snapshot database.

18. The non-transitory computer-readable storage medium of claim 17, wherein the recovery snapshot is identified further based on a set of snapshot parameters from at least one of a configuration file and a user input.

19. The non-transitory computer-readable storage medium of claim 17, wherein the recovery snapshot is selected from a set of end-to-end-hybrid cloud snapshots including the end-to-end hybrid cloud snapshot, and wherein the snapshot event is triggered at one or more periods of time before reaching a threshold associated with at least one of the error and the performance degradation.

20. The non-transitory computer-readable storage medium of claim 17, wherein the network is at least one of a hybrid cloud network or a multi-cloud network.

* * * * *